(12) United States Patent
Beerling et al.

(10) Patent No.: US 10,133,978 B2
(45) Date of Patent: Nov. 20, 2018

(54) DEVICE HAVING RFID TAG AND FLUIDICS ELEMENT

(75) Inventors: Bernardus Jozef Maria Beerling, Heeswijk-Dinther (NL); Petrus Johannes Wilhelmus Van Lankvelt, Boekel (NL); Wendela Meertens, Eindhoven (NL); Jeroen Hans Nieuwenhuis, Waalre (NL)

(73) Assignee: Minicare B.V., Eindhoven (NL)

( * ) Notice: Subject to any disclaimer, the term of this patent is extended or adjusted under 35 U.S.C. 154(b) by 510 days.

(21) Appl. No.: 13/879,960

(22) PCT Filed: Oct. 14, 2011

(86) PCT No.: PCT/IB2011/054562
§ 371 (c)(1),
(2), (4) Date: Apr. 17, 2013

(87) PCT Pub. No.: WO2012/052897
PCT Pub. Date: Apr. 26, 2012

(65) Prior Publication Data
US 2013/0214040 A1 Aug. 22, 2013

(30) Foreign Application Priority Data
Oct. 20, 2010 (EP) .................................... 10306144

(51) Int. Cl.
*G06F 17/00* (2006.01)
*G06K 19/077* (2006.01)
(Continued)

(52) U.S. Cl.
CPC .. *G06K 19/07773* (2013.01); *B01L 3/502715* (2013.01); *B01L 3/54* (2013.01);
(Continued)

(58) Field of Classification Search
CPC .... B01L 3/50; B01L 3/5027; B01L 3/502715; B01L 3/54; B01L 3/14; B01L 3/545; B01L 3/5453; B01L 3/56; A61B 5/1405; A61B 5/14; A61B 10/0045; G01N 35/00732; G01N 2035/00782; G01N 2035/00742; G01N 2035/00792; G01N 2035/00821
(Continued)

(56) References Cited

U.S. PATENT DOCUMENTS 7,178,416 B2 2/2007 Whelan
7,491,303 B2 * 2/2009 Sakata et al. ................. 204/400
(Continued)

FOREIGN PATENT DOCUMENTS

WO 2005074161 A1 8/2005
WO 2008099216 A1 8/2008

*Primary Examiner* — Steven S Paik
*Assistant Examiner* — April Taylor
(74) *Attorney, Agent, or Firm* — McCoy Russell LLP

(57) ABSTRACT

A device such as a disposable cartridge has an RFID tag (30) having an antenna (10), and a fluidic element (20, 160), the antenna having a shape to at least partly enclose an area, at least a part of the fluidic element being located in this area. By having such a structure, the device can be made more compact or the antenna can be made larger, and hence the costs for a given performance can be reduced, or the storage space for a given number of devices can be reduced.

19 Claims, 5 Drawing Sheets

(51) Int. Cl.
*B01L 3/00* (2006.01)
*G01D 18/00* (2006.01)

(52) U.S. Cl.
CPC ........ *G01D 18/00* (2013.01); *B01L 2300/023* (2013.01); *B01L 2300/024* (2013.01); *B01L 2300/0627* (2013.01)

(58) Field of Classification Search
USPC .................................................. 235/375, 492
See application file for complete search history.

(56) References Cited

U.S. PATENT DOCUMENTS

| | | |
|---|---|---|
| 8,220,717 B2 * | 7/2012 | Tasaki et al. .................. 235/492 |
| 8,525,643 B2 * | 9/2013 | Green et al. .................... 340/5.8 |
| 8,542,122 B2 * | 9/2013 | Goodnow et al. ......... 340/572.1 |
| 2004/0000713 A1 | 1/2004 | Yamashita |
| 2006/0011552 A1 * | 1/2006 | Utsunomiya .................. 210/695 |
| 2007/0075141 A1 * | 4/2007 | Veitch et al. .................. 235/435 |
| 2007/0171079 A1 | 7/2007 | Saito |
| 2007/0237678 A1 * | 10/2007 | Roesicke et al. .......... 422/82.01 |
| 2007/0298487 A1 * | 12/2007 | Bachur et al. ............. 435/287.2 |
| 2008/0114228 A1 * | 5/2008 | McCluskey et al. ......... 600/365 |
| 2009/0167503 A1 | 7/2009 | Cook |
| 2009/0209904 A1 * | 8/2009 | Peeters .......................... 604/66 |
| 2011/0025508 A1 * | 2/2011 | Stefanelli ................... 340/572.8 |

* cited by examiner

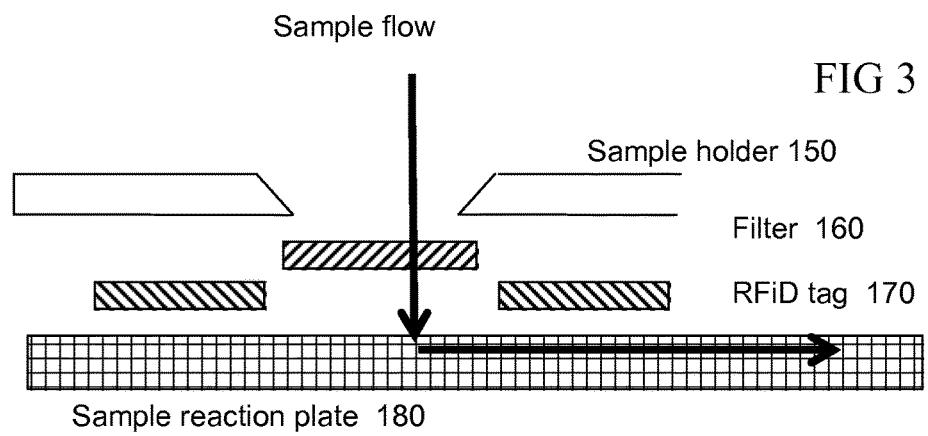
FIG 3
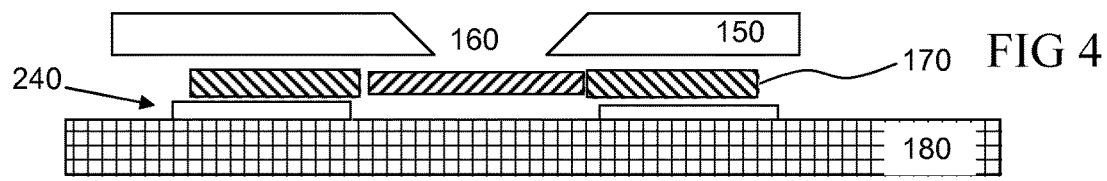
FIG 4
FIG 5
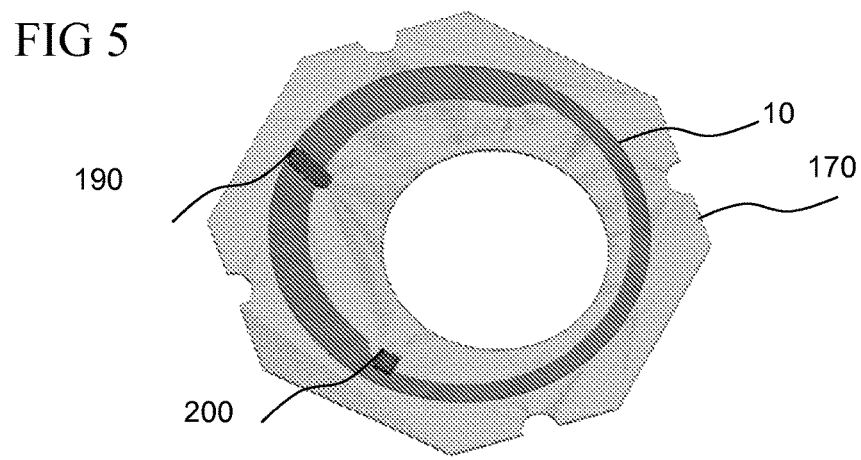

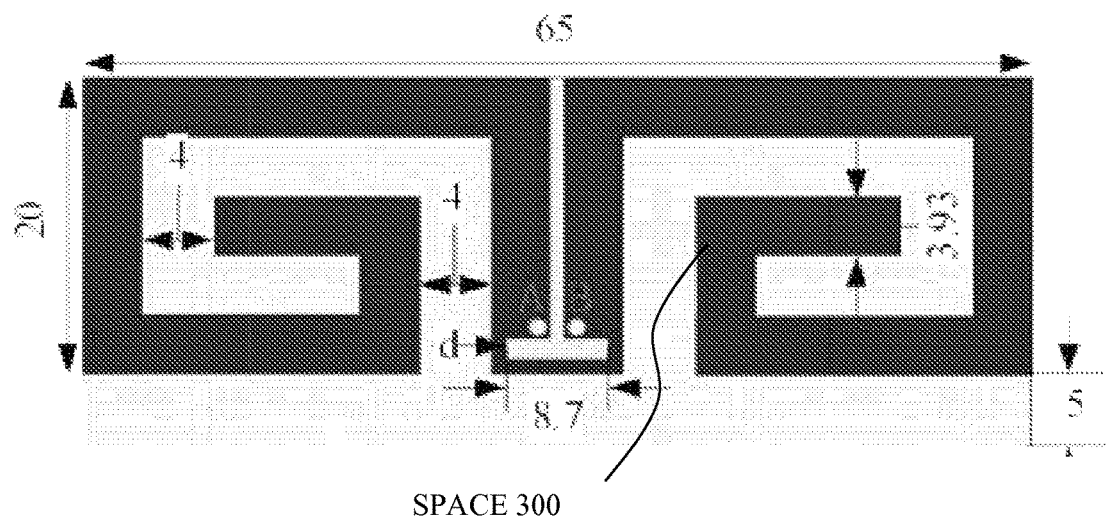
SPACE 300
FIG 7
FIG 8
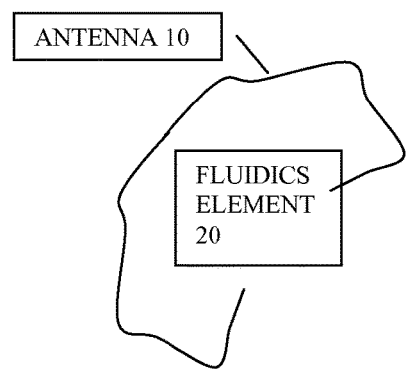

DEVICE HAVING RFID TAG AND FLUIDICS ELEMENT

FIELD OF THE INVENTION

This invention relates to devices having RFID tags, to systems having such devices, and to methods of using or manufacturing the devices, especially for biosensors or biomedical or biochemical sensors.

BACKGROUND OF THE INVENTION

RFID (radio frequency identification) tags are known for many applications. As explained in US 2009209904, conventional RFID tag systems include an RFID tag that transmits data for reception by an RFID reader (also referred to as an interrogater). In a typical RFID system, individual objects (e.g., store merchandise) are equipped with a relatively small tag that contains a transponder. The transponder has a memory chip that is given a unique electronic product code. The RFID reader emits a signal activating the transponder within the tag through the use of a communication protocol. Accordingly, the RFID reader is capable of reading and writing data to the tag. Additionally, the RFID tag reader processes the data according to the RFID tag system application. Currently, there are passive and active type RFID tags. The passive type RFID tag does not contain an internal power source, but is powered by radio frequency signals received from the RFID reader. Alternatively, the active type RFID tag contains an internal power source that enables the active type RFID tag to possess greater transmission ranges and memory capacity. The use of a passive versus an active tag is dependent upon the particular application. Accordingly, RFID tag systems have found use in a variety of applications. RFID tag system applications include animal identification, tracking items in transit, identifying drugs in hospitals or identifying lab samples such as blood.

Various different antenna configurations are known for such RFID tags. In one example a patch antenna is composed of either a thin flexible metal film such as aluminium or material that is printed using doped inks or other flexible and highly conductive materials such as conductive polymers. The antenna may be printed on the external surface of the tag in a pattern to cover a given area of the tag. The larger the area of the antenna, usually the better is the radio reception or transmission.

SUMMARY OF THE INVENTION

An object of the invention is to provide improved devices or methods. According to a first aspect, the invention provides:
A device having a fluidic element and an RFID tag, the RFID tag comprising an antenna having a shape so as to enclose at least a part of an area, wherein at least a part of the fluidic element being located in this area. In other words, the antenna may encounter a surface of a space, the fluidic element being at least partly located in this space. More particularly this surface may be a main surface of the space, "main surface" meaning that the space extends mainly over this surface and has a thickness relatively, thin with respect to the two other dimensions.

The word "enclose(s)" means that the antenna surrounds at least a part of said area, which means that it surrounds more than 50% of said area, optionally 60% or more, optionally 75% or more, optionally 90% or more, optionally 100%. In latter case, RFID tag surrounds entirely the area.

Optionally, the fluidic element (e.g. a sample filter) is entirely located in said space.

This configuration allows the device being not cumbersome, compactness, and to include the function of communication (via RFID tag) and a fluidic function (e.g. filtering, sample receiving) mainly in the same area or surface (or same space), especially if the fluidic element and the antenna extends mainly over a single plane (co-planarity), with a relatively thin thickness.

The tag can be part of a biosensor or a biomedical or a biochemical sensor for example.

By having such a structure, the device can have at least one of the following advantages: The device can be a disposable cartridge for single use which prevents contamination from frequent reuse and cleaning.

A storage device such as a memory can be provided for storing data relating to the device or a fluid sample held by the device, the data being accessible to a tag reader. This can be useful to allow data to be read that is relevant to the testing at the time of testing.

The antenna may be a loop antenna extending around the perimeter of the space or any other antenna that saves space on the device. The antenna is preferably suitable for operation at a frequency within any one of the ranges of 10 to 15 MHz and 860-960 MHz as these are common frequencies for RFID's.

The fluidics element can include any component relevant to the testing of fluids such as a reservoir for retaining a fluid sample, a channel for receiving a fluid sample, and a filter for filtering a fluid sample. Other elements can include a channel for cleaning/washing the device for example or an aperture for receiving a sample in the form of a drop of blood, and for mixing preloaded magnetic particles to bind to proteins in the drop of blood.

It can be made more compact and/or the antenna of the RFID tag can be made larger, and/or costs for a given performance can be reduced, and/or the storage space for a given number of devices can be reduced.

Other aspects of the invention include systems and methods for testing the lab sample held by the device, and reading the data stored by the tag. In the system or method the data to be read can be calibration information relating to test materials used for testing the fluid sample. Optionally the calibration information can be stored in a storage device on the RFID tag. The calibration information can be adjusted dependent upon the length of time between assembly of the device and use of the device. For security an expiry time can also stored after which the device can no longer be used.

Another aspect provides corresponding methods of manufacturing such devices having RFID tags. Embodiments of the invention can have any additional features added to, or disclaimed from, the above aspects, and some such additional features are set out in dependent claims and described in more detail below.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

Other potential features or options of the inventions can be found in the claims 2 through 15.

BRIEF DESCRIPTION OF THE DRAWINGS

How the present invention may be put into effect will now be described by way of example with reference to the appended drawings, in which:

FIG. 3 shows a cross section view of an embodiment in parts before assembly, FIG. 4 shows a cross section view of the embodiment of FIG. 3 after assembly, FIG. 5 shows a plan view of a tag for use in a device according to an embodiment having a ring antenna, FIG. 7 shows a plan view of another embodiment, FIG. 8 shows a schematic view of another embodiment.

DETAILED DESCRIPTION

Figure 1:
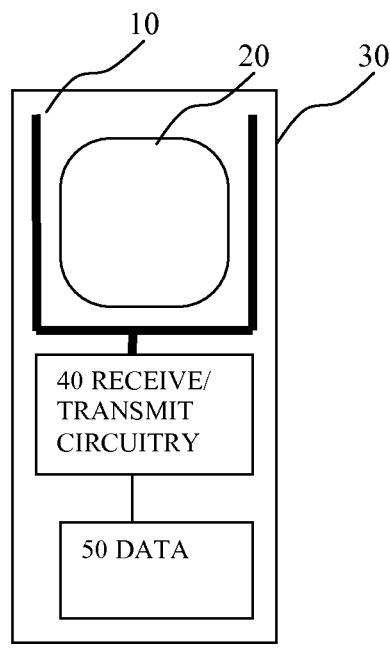
FIG. 1 shows a schematic view of a tag according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of embodiments of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination. Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention. References to a signal can encompass any kind of signal in any medium, and so can encompass an electrical or optical or wireless signal or other signal for example. References to analyzing can encompass processing a signal in any way to derive or enhance information about the sample. References to a processor can encompass any means for processing signals or data in any form and so can encompass for example a personal computer, a microprocessor, analog circuitry, application specific integrated circuits, software for the same, and so on.

References to a cartridge can encompass any size or shape of cartridge, made of plastic or of any material, for retaining one or many samples. In the description provided herein, numerous specific details are set forth. However, it is understood that embodiments of the invention may be practiced without these specific details. In other instances, well-known methods, structures and techniques have not been shown in detail in order not to obscure an understanding of this description.

In the following reference will be made to blood samples. In all cases where blood is mentioned this should be understood as encompassing a "fluid sample". Other materials to be tested could be used instead, e.g. preferably aqueous solutions, and more preferably biologically relevant fluids such as plasma, serum, saliva, urine, buffers, etc. but also organic fluids can be tested.

INTRODUCTION TO FEATURES OF THE EMBODIMENTS

A device having an RFID tag in accordance with embodiments of the present invention, can have a large antenna, increasing the dimensions of the disposable cartridge compared to typical existing cartridges. Furthermore, the metal of the antenna of the tag can be quite vulnerable, typically requiring a protective layer, which adds cost to the disposable.

For the development of medical or other test devices, it is useful to integrate an information carrier with typical properties to support the test performed, with the sample being tested in a combined device to facilitate rapid and reliable analysis. The information carrier is defined as an RFID tag, comprising a circular antenna design. The center of this antenna design has a non-functional area. By making this non-functional area into a functional area of the test device, it can help keep the device compact, can enable a single cover to be used to protect the entire RFID tag, and helps enable a better trade off of different desirable properties of the RFID tag, such as having a large antenna yet a compact overall size, with more functions but without needing separate protective covers.

FIG. 1, a First Embodiment

FIG. 1 shows an example of a device (e.g. a cartridge) having an RFID tag 30 according to an embodiment of the present invention. The device having a RFID tag 30 can be a cartridge, for example a disposable cartridge. FIG. 1 shows an RFID tag having an antenna 10. The antenna 10 is typically made of wires that can form for example a loop antenna e.g. with closed-loop wires, e.g. in the form of a square, circle, oval, ellipse or similar but the antenna may also be not closed but open on a side or sides to thus enclose a space or area of the RFID tag partially or completely. For example the antenna can be made of an elongate conductive material such as a metal wire or wires and extends around an area either completely or only partially, e.g. around 50% or 75% of the area such as on three sides of a part 20, which forms part of the device, e.g. a cartridge as will be described later. This part of the sample holder may contain one or more elements relevant to the biological function such as e.g. a blood filter. The rest of the sample holder is not shown. It could extend for example beneath the antenna and beneath other circuitry on the tag. The antenna can be co-located in a plane with at least part of the sample holder but this is not essential and they could be in different planes. In accordance with embodiments of the present invention a space that is an inner unused or 'open part' of the device surrounded at least in part by the antenna is used to locate functional fluidics elements, e.g. biologically relevant elements of the device, such as a sample holder. The functional fluidics elements, e.g. biologically relevant elements of the sample holder do not have to be exactly in the same plane, e.g. the layers can be substantially coplanar. The antenna is coupled to receive/transmit circuitry 40 which is coupled to data 50 which may be stored or generated when needed to be transmitted. The data store may be for example provided by a microchip which may be the same chip as used to implement receive/transmit circuitry, or may be a different chip.

Since the antenna extends around and encloses at least a certain part of e.g. at least three sides of the part of the lab sample holder, the antenna shape necessarily defines an interior space which would conventionally be unused. Many different antenna patterns can be envisaged which enclose partially or completely an interior space.

Optionally, the antenna can fully enclose this space, but antennas are included within the scope of the invention which do not completely enclose.

Some Additional Features

Some additional features are as follows, others may be envisaged: The lab sample holder can have a transparent layer to enable the sample to be visible, e.g. through a window, for testing if the tag is coupled to a reader. This can help enable optical testing with a minimum of handling of the sample.

The tag can have a store for storing data relating to the lab sample, the data being accessible to a reader. Such data can include data identifying the sample, or results of on board testing or monitoring of the sample or the conditions experienced by the sample for example. Preferably the device has a data store used to store information related to the materials stored in the device. In particular in a preferred embodiment of the present invention the data stored relates to for example calibration data for the materials used on the tag. This calibration data can be generated and stored at the time of assembly of the device. Batches of biological materials such as antibodies or antibody fragments, reagents, DNA, RNA, lipids, cell, membranes, bacteria, viruses, proteins, enzymes, labels, buffers or similar may have differing activities depending upon the batch. Such calibration information is stored in a storage device such as solid state memory and can be read out at the time of reading out the results of any processes, such as diagnosis or sampling tests carried out by the tag. This calibration data allows the results to be normalised in the read-out device. The memory is preferably a non-volatile memory. Optionally the calibration can be adjusted for length of time between assembly and use but this requires a processor and hence is best done in the reader. So the time of assembly is one type of data which can be stored. An expiry time can also be stored after which the device can no longer be used.

The device can be protected, e.g. to protect both the antenna and the part of the fluidic elementing accordance with any known means.

The antenna can comprise a circular antenna extending around the perimeter of the part of the lab sample holder. This is one arrangement of the antenna, others are feasible. The antenna can be of a shape and size suitable for operation at a frequency range of 10 to 15 MHz, for example a high frequency of 13.56 MHz or ultra high frequency, in a range of 860-960 MHz.

The part of the fluidics element can comprise any one or more of: a reservoir for retaining the lab sample, an aperture for receiving the lab sample, and a filter for filtering a fluid sample, an example is a filter for separating plasma from a blood sample.

The device can have an aperture for receiving a sample in the form of a drop of blood, and can have a region for mixing a reagent such as preloaded magnetic particles to bind to proteins in the drop of blood. This can enable rapid testing if the tag can do such mixing, and can help minimize handling of the sample. The device can be in any form of a cartridge, e.g. a disposable cartridge.

Figure 2:
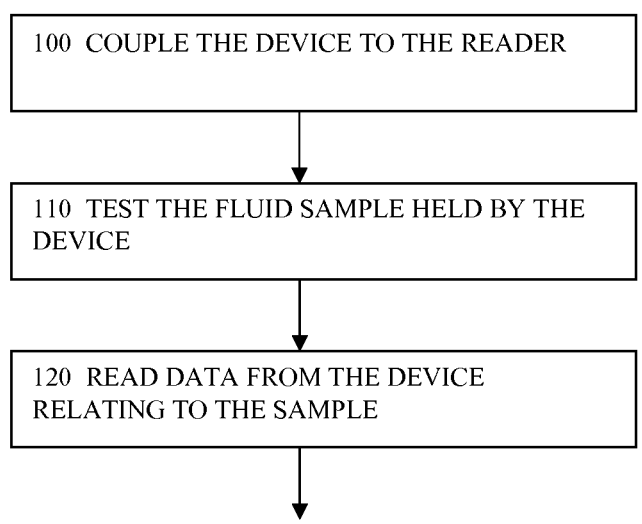
FIG. 2 shows steps in a method of testing according to an embodiment.

FIG. 2 Testing Steps According to an Embodiment of the Invention

FIG. 2 shows some steps in a method of testing a fluid sample held by a device having an RFID tag. Other steps can be added. The device can be in any form of a cartridge, e.g. a disposable cartridge. The fluid sample has already been loaded onto the device. At step 100, the device is coupled to a reader. At step 110 testing of the sample held in the tag takes place. At step 120 data relating to the sample is read from the tag via the antenna. Many variations can be envisaged. In some embodiments the data relating to the sample can be test result data. In other embodiments the data can be to identify the device or the fluid sample for example. In this case, typically steps 110 and 120 can be carried out in reverse order: first information about the fluid sample is read and next a test is carried out, which can be adjusted according to the information about the sample.

FIGS. 3,4,5, Embodiments of the Invention

FIG. 3 shows a cross section view of an embodiment in parts before assembly. A sample holder 150 is shown having an aperture suitable for holding a droplet of fluid by capillary action. Below the aperture is a fluidic element, in this case a filter 160. Next is shown a layer 170 having the antenna and circuitry of the RFID tag. This has a space enclosed by the antenna. A base is formed by a sample reaction plate 180 which can have further fluidics elements such as chambers, valves and so on. Optionally, a laminate foil layer (not shown) is provided between the sample reaction plate 180 and RFID tag 170 and/or between the sample holder 150 and the RFID tag 170, but still provide an aperture to allow the sample to be input. The foil may be opaque or transparent.

This configuration allows the RFID tag to be integrated into a disposable cartridge. Arrows indicate a flow of the sample during use of the device for testing the sample for example. FIG. 4 shows a cross section view of the embodiment of FIG. 3 after assembly. This shows that the filter 160 is located in the space enclosed by the antenna, and so is coplanar with a principal plane of the antenna of the RFID layer.

FIG. 5 shows a plan view of a tag for use in a device according to an embodiment having a ring antenna. This can form the layer 170 of FIGS. 3 and 4 or can be part of other embodiments. The antenna 10 is formed as a metal layer on a substrate. An integrated circuit 190 is coupled to the antenna and can provide transmit and receive circuitry. A separate chip 200 can be provided to provide further circuitry such as storage. There can be electrical connections not shown between the chips.

The RFID tag can be effectively integrated into a disposable cartridge. For example, a cartridge base can have some fluidic elements such as reservoirs, valves and conduits. Above this, a layer such as a laminate foil 240 can be provided to cover these features, but still provide an aperture to allow the sample to be input. The foil may be opaque or transparent. The next layer can be the RFID layer 170, e.g. having printed circuitry including the antenna and having active or passive electrical components as needed, integrated or soldered on. A hole can be provided in this layer of the tag which leaves space for another device such as membrane, e.g. a filter membrane 160 for blood separation or plasma separation. This can be located coplanar with the antenna to use the space left by the antenna.

This embodiment is notable as follows:
By using the dead-space in the middle of the RFID tag for the filter 160 such as the blood filter the dimensions of the cartridge can be kept small, which can improve handling and reduce cost of the disposable.
The RFID tag is sealed between two plastic pieces of the device, which means that no additional protective layer is needed on the tag; this also helps to reduce the number of parts and hence a cost of the device, which is particularly useful if the device is a disposable device.
The integration of the RFID tag avoids the need for other parts such as electrical contacts or barcodes outside the holder, for reading the tag, and helps keep the tag compact and protective for the cartridge.
The assembly of this design RFID tag has advantages for easy and accurate positioning of the tag.

Non-volatile memory can be used for storing information on the tag. Materials used in the devices (e.g. disposable cartridges) can have variations in characteristics owing to material or manufacturing tolerances for example. These can be measured against a calibrated reference in the factory per batch. The measurements can be translated into results in the form of a master curve for example which can be downloaded to the reader. The reader can read a batch number from the device and select the corresponding master curve for tuning or calibrating the processing or testing of the fluid sample. Optionally such calibration can be adjusted for a length of time between assembly and use but this requires a processor and hence is best done in the reader. So the time of assembly is another possible piece of data relating to the sample to be stored on the tag. An expiry time can also be stored after which the device can no longer be used for example.

Figure 6:
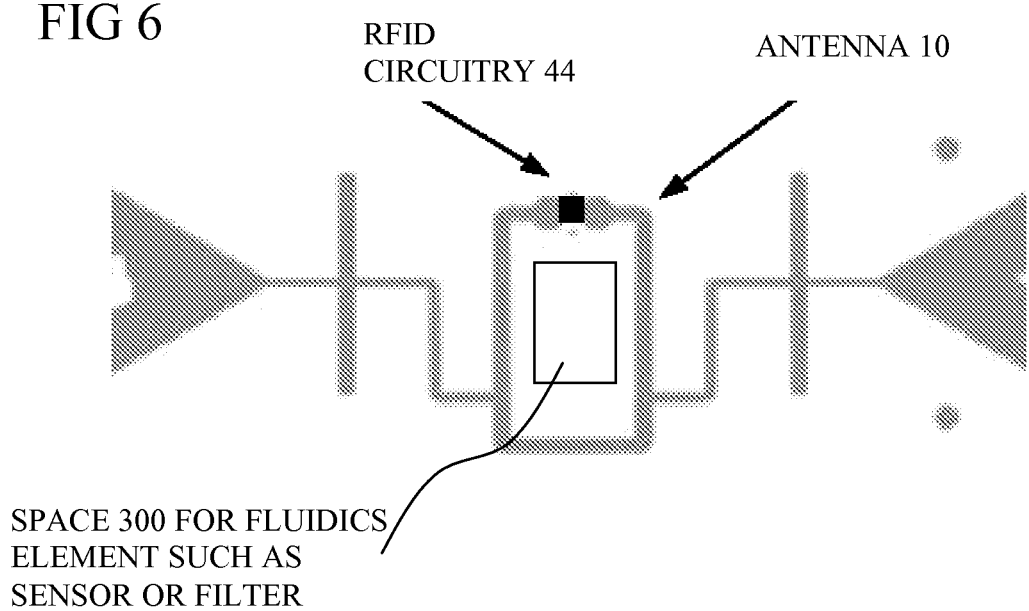
FIG. 6 shows a plan view of a tag for a device according to another embodiment.

FIGS. 6, 7 and 8, Other Embodiments

FIG. 6 shows a plan view of a tag for a device according to another embodiment. This shows an alternative shape for the antenna 10, again having a ring, this time with triangular and other shaped parts for altering electrical characteristics following established principles. RFID circuitry 44 is shown at one point in the ring. Again the ring provides an enclosed space 300 for locating fluidics elements such as a sample holder, sensor or filter for example.

FIG. 7 shows a plan view of another antenna for use in devices according to embodiments. In this case, as shown, the antenna has two spiral arms, which both provide enclosed spaces 300, for locating fluidics elements. Various dimensions are shown, which are examples only and can be varied.

FIG. 8 shows a schematic view of another embodiment. The antenna 10 has two arms forming a shape partly enclosing a fluidics element 20. This is an example to show that the antenna can take other shapes which may partly enclose a space.

In any of the embodiments, the RFID can be either passive or active. Active means it has its own local energy source, whereas a passive device means that energy is provided externally e.g. by RF power received at the antenna and then stored, e.g. in a capacitor.

Furthermore, in any of the embodiments, the device can either be "disposable" or reusable. Disposable means it can be used once and cannot be used again. This avoids cross-contamination of test results. Thus in some embodiments, the device is preferably adapted to single-use operation. This adaptation can be in the form of providing enough reagents only for one test or providing any kind of lock which locks the device after one use. In one example, new data can no longer be written to the device. As well or instead, the functional fluidic elements can be made so that they do not operate repeatedly. The lock in one example does not prevent the stored data identifying the sample or device from being read out repeatedly if needed.

Figure 9:
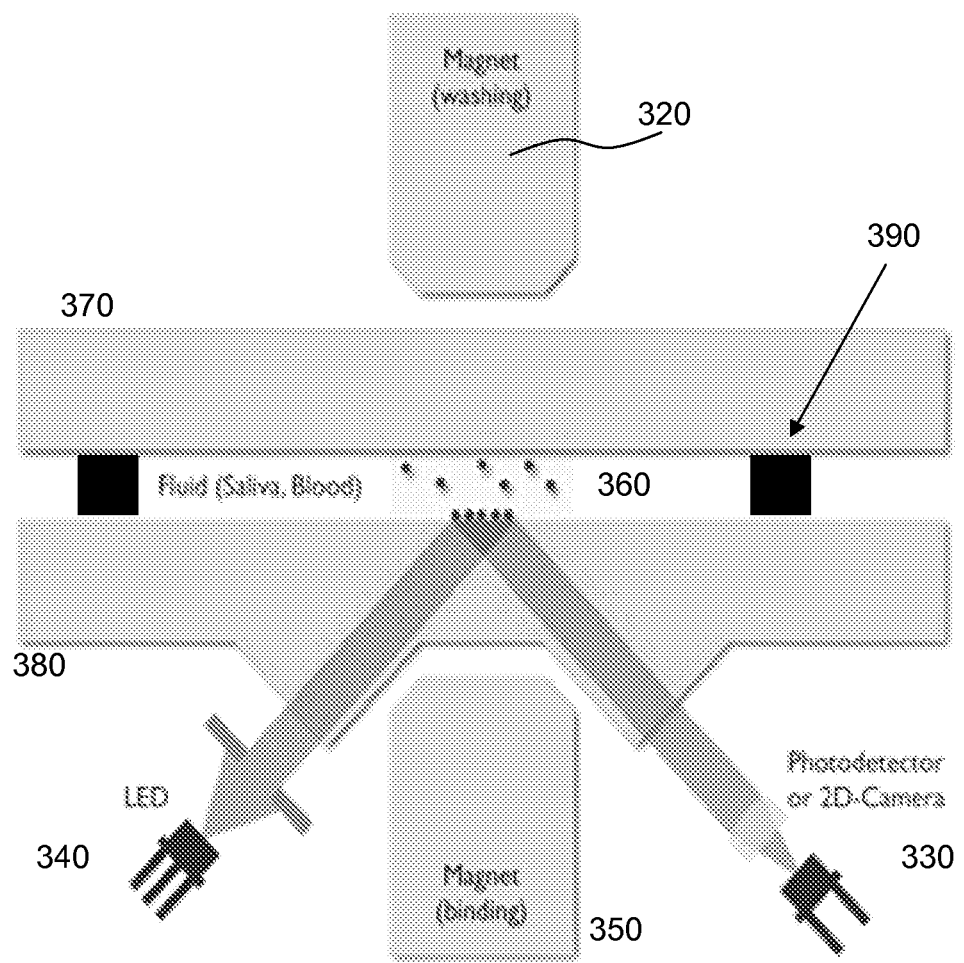
FIG. 9 shows a an example of a testing system having a device and a reader according to an embodiment using magnetic particle labels and magnetic actuation, with optical sensing.

FIG. 9, a Testing System According to an Embodiment Using Magnetic Labeling and Activation FIG. 9 shows a schematic view of an example of a system according to an embodiment for testing lab samples, the system comprising a tag and a reader (not shown) for testing a lab sample held in the tag, and for reading data from the tag via the antenna. The figure shows a fluid sample 360 held by the device for example between two layers 370, 380 of the device, such as a device (or cartridge) base and a laminate foil, as described above with reference to FIG. 3 and FIG. 4, as well as an RFID tag 390. The parts of the reader shown include a washing magnet 320, and a binding magnet 350, and optical sensing equipment including an LED illuminator 340, and a photodetector or camera 330. Other parts are not shown such as an RFID reader, which can be implemented according to established practice and so need not be described here in more detail. The operation of such a system will now be described.

This is a type of biosensor platform that uses magnetic nanoparticles to identify target molecules either qualitatively or quantitatively. The bio sensor platform is suitable to enable complex in-vitro diagnostic tests to be carried out away from the laboratory and into decentralized settings, including the patient's bedside and at home.

In-vitro diagnostic tests to detect molecular 'biomarkers' of disease in samples of body fluids such as blood or saliva are a valuable tool for diagnosing disease. As a general rule, the cost and complexity of these tests increases as the concentration of the target biomarker decreases. For example, measuring the relatively high concentrations of glucose in blood samples to assist in the management of diabetes has been reduced to a simple pinprick test that patients can perform on a daily basis at home. At the other end of the scale, measuring very low concentrations (picomolar levels) of blood protein biomarkers for the diagnosis of cardiovascular disease currently requires large sample volumes and a time-to-result of tens of minutes.

This type of biosensor is based on magnetic nanoparticle technology, which can conveniently measure picomolar concentrations of specific proteins in blood or saliva in a matter of minutes. Integrated into a tag which acts as a disposable biosensor cartridge that inserts into a hand-held analyzer, it may be capable of sensitive in-vitro diagnostic protein tests. The tag can be formed largely of plastic as a disposable cartridge that automatically fills itself from a single drop of blood.

Magnetic labeling and activation can be used instead of existing laboratory-based blood protein assays which typically involve a significant amount of fluid handling (for example, pipetting, reagent mixing, and centrifugation), resulting in relatively complex equipment setups. In addition, the volume of blood required often involves a skilled phlebotomist or nurse withdrawing a syringe-full of blood from the patient.

The sample holder can automatically fills itself from a single drop of blood, so that once filled, no other fluid movement is required. The entire assay process within the cartridge is performed by externally applying magnetic fields to control the movement of magnetic nanoparticles in the cartridge. The magnetic nanoparticles are preloaded into the cartridge during its manufacture and automatically disperse into the sample as the cartridge fills with blood. Coated with appropriate ligand molecules, they bind to target protein molecules in the sample blood. After a short time, typically around a minute, a large fraction of the target protein molecules end up being bound to the surface of the magnetic nanoparticles.

A small electromagnet 350 situated beneath the cartridge then generates a magnetic field that attracts all the magnetic nanoparticles to the biosensor's active surface, which is coated with ligand molecules that bind to a second binding site on the target protein. As a result of this magnetic attraction, the surface concentration of the target protein is significantly increased, which speeds up the binding process. The target protein molecules end up locked in a sandwich between the active surface on one side and attached nanoparticles on the other. This type of assay is therefore often referred to as a 'sandwich assay'.

An electromagnet 320 situated above the cartridge then generates a magnetic field that pulls unbound magnetic nanoparticles away from the active surface. In this way, a very fast and accurately controlled separation between bound and unbound magnetic nanoparticles is achieved, which replaces traditional washing steps. Because each magnetic nanoparticle that remains on the surface is bound there by a target protein molecule, the number of nanoparticles remaining at the surface is a measure of the target protein concentration in the blood sample.

In a final phase, the number of bound nanoparticles is measured using an optical technique based on frustrated total internal reflection. Illuminated at the correct angle, light hitting the underside of the sensor's active surface is normally reflected without any loss in intensity (total internal reflection). However, when nanoparticles are bound to the opposite side of the surface they scatter and absorb the light, reducing the intensity of the reflected beam. These intensity variations in the reflected beam, which correspond to the number of bound nanoparticles, are detected by a CMOS image sensor similar to that used in a digital camera.

The sample holder of the cartridge can be constructed entirely from plastic components and has no moving parts or embedded electronics, and is disposable. It can plug into a reader which can be a hand-held unit that contains the electromagnets, optical detection system, control electronics, software and a read-out display.

The active area of the biosensor can be sufficiently large that it can be spotted with ligands for several different proteins, opening up the possibility of performing multiple assays in a single operation. In addition to the 'sandwich assay' described above, the technology can be adapted to perform other types of assay, such as 'competition assays,' which may be suitable for the detection of drugs-of-abuse and other small molecules in body fluid samples.

Optionally the system can be arranged so that the test results are written to the device via the RFID tag, and stored on the tag. This can help ensure results are physically associated with the correct fluid sample, to reduce a risk of errors.

Other variations can be envisaged within the scope of the claims.

The invention claimed is:

1. A method of testing a fluid sample held by a device comprising: a fluidic element; and an RFID tag, the RFID tag comprising an antenna, the antenna having a shape configured to enclose at least a portion of a space, wherein at least a part of the fluidic element is located in the space, the method comprising:
coupling the device to a reader,
testing the fluid sample held in the device,
reading calibration information of test materials used for the testing of the fluid sample by the device and data of the fluid sample from the RFID tag via the antenna;
adjusting the calibration information based upon a length of time between assembly of the device and use of the device; and
adjusting read data of the fluid sample in accordance with the adjusted calibration information.

2. A method of testing a fluid sample according to claim 1, further comprising storing data relating to the device or a fluid sample held by the device.

3. A method of testing a fluid sample according to claim 1, further comprising accessing the data with a tag reader.

4. A system for testing fluid samples, the system comprising:
   a device comprising: a fluidic element; and an RFID tag, the RFID tag comprising an antenna, the antenna having a shape configured to enclose at least a portion of a space, wherein at least a part of the fluidic element is located in the space;
   a reader configured to test a fluid sample held in the device, and to read data relating to the fluid sample from the RFID tag via the antenna, wherein the data comprise calibration information relating to test materials used for testing the fluid sample, wherein:
   the calibration information is adjusted based upon a length of time between assembly of the device and use of the device; and
   the read data relating to the fluid sample is adjusted in accordance with the adjusted calibration information.

5. A system according to claim 4, wherein the calibration information is stored in a storage device on the RFID tag.

6. A system according to claim 5, wherein an expiry time is stored after which the device can no longer be used.

7. The system of claim 4, wherein the device comprises a disposable cartridge for single use.

8. The system of claim 4, further comprising a protective cover to protect both the antenna and the part of the fluidic element.

9. The system of claim 4, the antenna comprising a loop antenna extending around a perimeter of the space.

10. The system of claim 4, the antenna being adapted for operation at a frequency within any one of ranges of 10 to 15 MHz, and 860-960 MHz.

11. The system of claim 4, the fluidics element comprising any one or more of: a reservoir for retaining a fluid sample, a channel for receiving a fluid sample, and a filter for filtering a fluid sample.

12. A device, comprising:
   a fluidic element;
   an RFID tag comprising an antenna, the antenna having a shape configured to enclose at least a portion of a space, wherein at least a part of the fluidic element is located in the space; and
   a memory configured to store calibration information identifying when the device was assembled, and calibration information relating to test materials used for testing the fluid sample, wherein: the calibration information is adjusted based upon a length of time between assembly of the device and use of the device, and the adjusted calibration information is stored in the memory.

13. The device of claim 12, wherein the device comprises a disposable cartridge for single use.

14. The device of claim 12, wherein the memory further stores data relating to a fluid sample held by the device, the data being accessible to a tag reader.

15. The device of claim 12, further comprising a protective cover to protect both the antenna and the part of the fluidic element.

16. The device of claim 12, the antenna comprising a loop antenna extending around a perimeter of the space.

17. The device of claim 12, the antenna being adapted for operation at a frequency within any one of ranges of 10 to 15 MHz, and 860-960 MHz.

18. The device of claim 12, the fluidics element comprising any one or more of: a reservoir for retaining a fluid sample, a channel for receiving a fluid sample, and a filter for filtering a fluid sample.

19. The device of claim 12, wherein the memory further stores data relating to a fluid sample held by the device, the data being accessible to a tag reader.

* * * * *